US012615111B2

(12) United States Patent
Peruga Nasarre et al.

(10) Patent No.: US 12,615,111 B2
(45) Date of Patent: Apr. 28, 2026

(54) RESOURCE ELEMENT ALLOCATION IN CELLULAR SYSTEM

(71) Applicant: Nokia Technologies Oy, Espoo (FI)

(72) Inventors: Ismael Peruga Nasarre, Oulu (FI); Kari Pekka Pajukoski, Oulu (FI); Esa Tapani Tiirola, Oulu (FI); Juha Yli-Kaakinen, Tampere (FI); Mikko Valkama, Nokia (FI)

(73) Assignee: Nokia Technologies Oy, Espoo (FI)

( * ) Notice: Subject to any disclaimer, the term of this patent is extended or adjusted under 35 U.S.C. 154(b) by 371 days.

(21) Appl. No.: 18/548,289

(22) PCT Filed: Mar. 23, 2021

(86) PCT No.: PCT/EP2021/057332
§ 371 (c)(1),
(2) Date: Aug. 29, 2023

(87) PCT Pub. No.: WO2022/199793
PCT Pub. Date: Sep. 29, 2022

(65) Prior Publication Data
US 2024/0187148 A1 Jun. 6, 2024

(51) Int. Cl.
*H04L 5/00* (2006.01)
*H04W 72/044* (2023.01)

(52) U.S. Cl.
CPC .......... *H04L 5/0007* (2013.01); *H04L 5/0092* (2013.01); *H04W 72/044* (2013.01)

(58) Field of Classification Search
CPC . H04L 5/0007; H04L 5/0092; H04L 27/2601; H04L 5/0042; H04W 72/044; H04W 72/0453
See application file for complete search history.

(56) References Cited

U.S. PATENT DOCUMENTS

2018/0343665 A1* 11/2018 Yan ................... H04W 72/0453
2019/0268907 A1* 8/2019 Bhattad ............. H04W 72/0453
(Continued)

FOREIGN PATENT DOCUMENTS

WO 2020/030127 A1 2/2020
WO 2020/155889 A1 8/2020
(Continued)

OTHER PUBLICATIONS

"3rd Generation Partnership Project; Technical Specification Group Radio Access Network; NR; Physical channels and modulation (Release 16)", 3GPP TS 38.211, V16.3.0, Sep. 2020, pp. 1-133.
(Continued)

*Primary Examiner* — Sharmin Chowdhury
(74) *Attorney, Agent, or Firm* — Nokia Technologies Oy

(57) ABSTRACT

This document discloses a solution for occupying time-frequency resources for a wireless transmission. According to an aspect, a method comprises: determining time-frequency resources in a channel configuration, wherein the time-frequency resources is a combination of a first number of frequency resources and a number of time resources, wherein the first number of frequency resources is defined in units of consecutive resource blocks each having a determined number of resource elements; determining whether or not the first number of frequency resources is expressible as $2^a \cdot 3^b \cdot 5^c$ where [a, b, c] are non-negative integers, and in case the first number of frequency resources is not expressible as $2^a \cdot 3^b \cdot 5^c$, determining a second number of frequency resources and a third number of frequency resources in the first number of frequency resources, wherein the second number of frequency resources is expressible as $2^a \cdot 3^b \cdot 5^c$, wherein the third number of frequency resources is not overlapping with the second number of frequency resources; occupying the second number of frequency resources within the number of time resources with information symbols and occupying the third number of frequency resources within the number of time resources for a wireless transmission; and generating and causing the wireless transmission comprising the occupied frequency resources.

8 Claims, 7 Drawing Sheets

RESOURCE BLOCKS & INDICES

| 0 | 1 | 2 | 3 | ... | 102 | 103 | 104 | 105 |

CONVENTIONAL MAXIMUM ALLOCATION

SECOND NUMBER OF FREQUENCY RESOURCES

THIRD NUMBER OF FREQUENCY RESOURCES FOR ADDITIONAL INFORMATION SYMBOLS

(56)                    References Cited

U.S. PATENT DOCUMENTS

2020/0287688 A1*    9/2020   Takeda .................. H04L 5/0053
2021/0105774 A1*    4/2021   Oh ..................... H04W 72/0453
2021/0168773 A1     6/2021   Jia et al.
2022/0132482 A1     4/2022   Gokcell et al.

FOREIGN PATENT DOCUMENTS

WO          2022/152368 A1    7/2022
WO          2022/161836 A1    8/2022

OTHER PUBLICATIONS

"Discussion on approaches and solutions for NR PUSCH coverage enhancement", 3GPP TSG RAN WG1 #103, R1-2008703, Agenda: 8.8.2.1, Nokia, Oct. 26-Nov. 13, 2020, 15 pages.
"3rd Generation Partnership Project; Technical Specification Group Radio Access Network; NR; User Equipment (UE) radio transmission and reception; Part 2: Range 2 Standalone (Release 15)", 3GPP TS 38.101-2, V15.3.0, Sep. 2018, pp. 1-106.
"RAN1 Chairman's Notes", 3GPP TSG RAN WG1 Meeting #103-e, Oct. 26-Nov. 13, 2020, 78 pages.
International Search Report and Written Opinion received for corresponding Patent Cooperation Treaty Application No. PCT/EP2021/057332, dated Dec. 14, 2021, 16 pages.
"3rd Generation Partnership Project; Technical Specification Group Radio Access Network; NR; Physical layer procedures for data (Release 16)", 3GPP TS 38.214, V16.4.0, Dec. 2020, pp. 1-169.

* cited by examiner

RESOURCE BLOCKS & INDICES

| 0 | 1 | 2 | 3 | ... | 102 | 103 | 104 | 105 |
|---|---|---|---|-----|-----|-----|-----|-----|

CONVENTIONAL MAXIMUM ALLOCATION

SECOND NUMBER OF
FREQUENCY RESOURCES

THIRD NUMBER OF FREQUENCY RESOURCES
FOR ADDITIONAL INFORMATION SYMBOLS

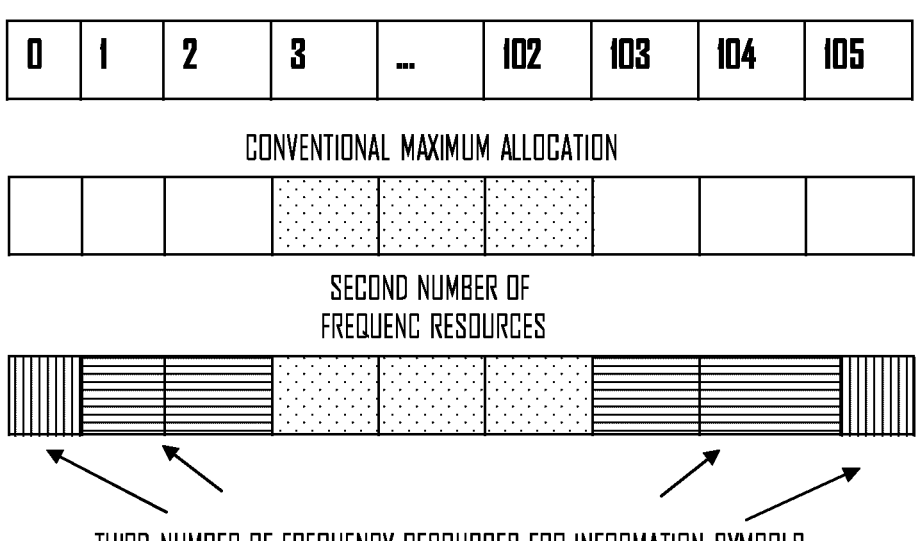

RESOURCE BLOCKS & INDICES

| 0 | 1 | 2 | 3 | ... | 102 | 103 | 104 | 105 |

CONVENTIONAL MAXIMUM ALLOCATION

SECOND NUMBER OF
FREQUENC RESOURCES

THIRD NUMBER OF FREQUENCY RESOURCES FOR INFORMATION SYMBOLS
AND SIGNAL ELEMENTS FOR SHAPING WAVEFORM OF WIRELESS TRANSMISSION

Fig. 7

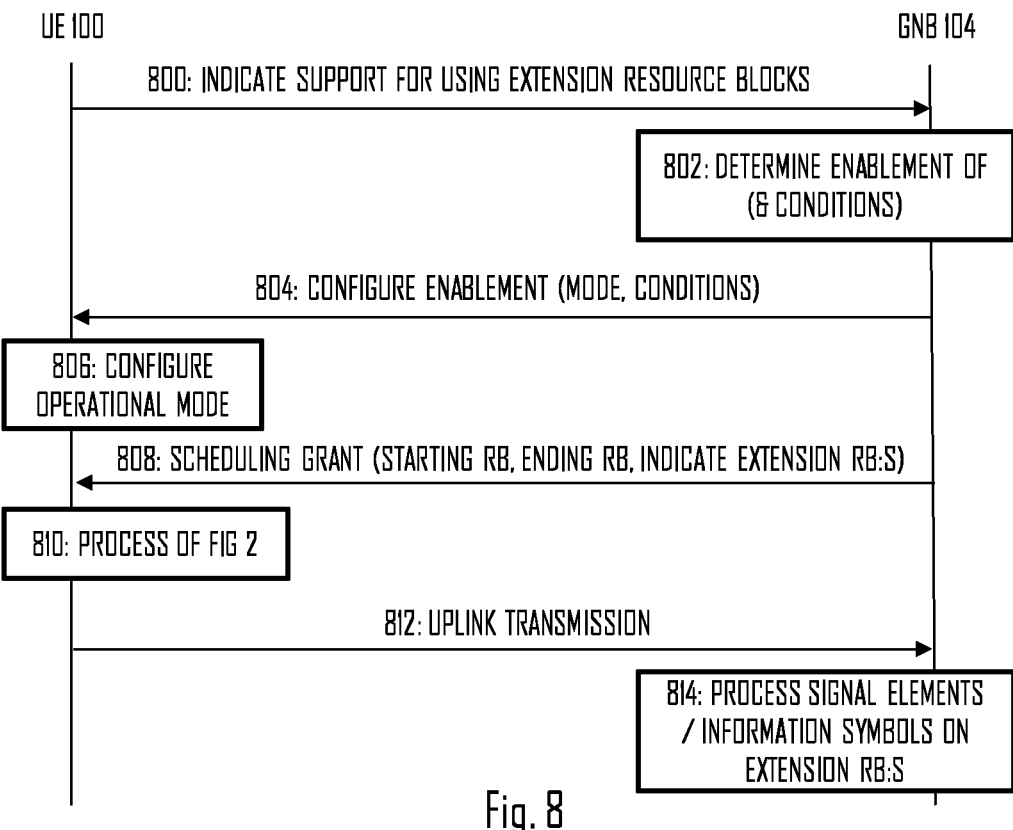

UE 100                                                         GNB 104

800: INDICATE SUPPORT FOR USING EXTENSION RESOURCE BLOCKS

802: DETERMINE ENABLEMENT OF
(& CONDITIONS)

804: CONFIGURE ENABLEMENT (MODE, CONDITIONS)

806: CONFIGURE
OPERATIONAL MODE

808: SCHEDULING GRANT (STARTING RB, ENDING RB, INDICATE EXTENSION RB:S)

810: PROCESS OF FIG 2

812: UPLINK TRANSMISSION

814: PROCESS SIGNAL ELEMENTS
/ INFORMATION SYMBOLS ON
EXTENSION RB:S

Fig. 8

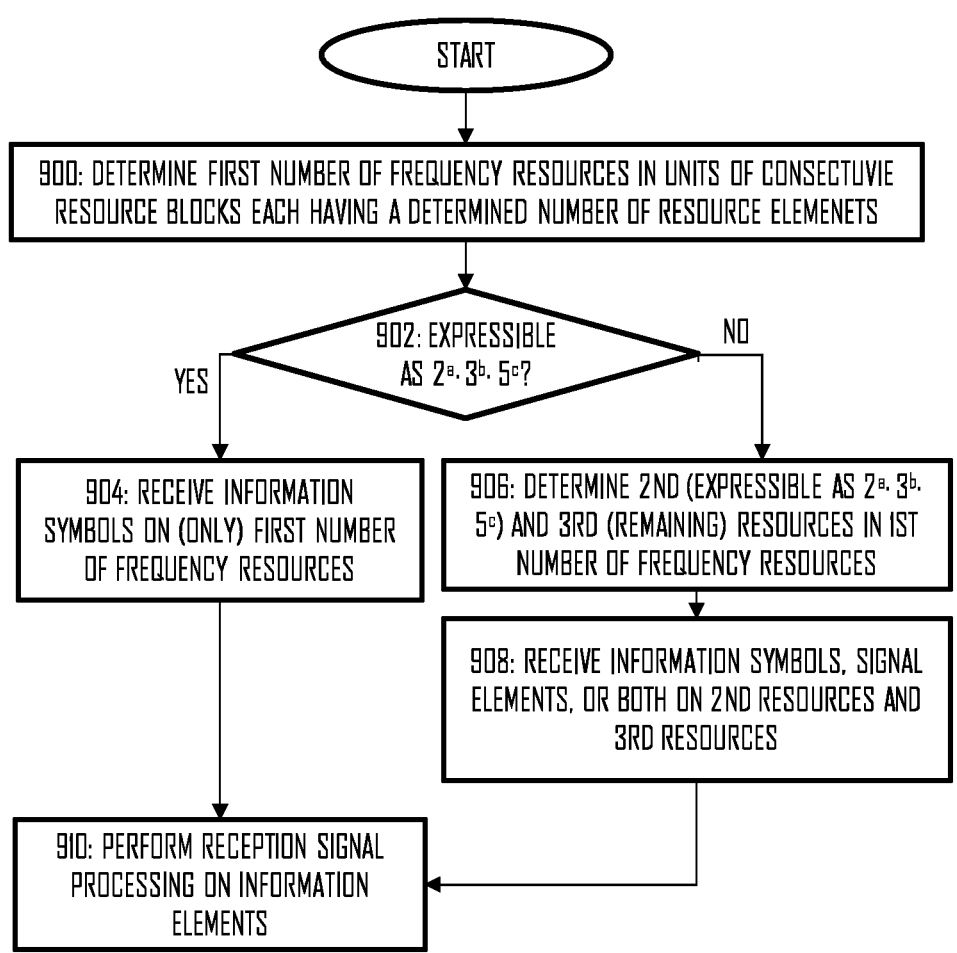

START

900: DETERMINE FIRST NUMBER OF FREQUENCY RESOURCES IN UNITS OF CONSECTUVIE RESOURCE BLOCKS EACH HAVING A DETERMINED NUMBER OF RESOURCE ELEMENETS

902: EXPRESSIBLE AS $2^a \cdot 3^b \cdot 5^c$?

YES

NO

904: RECEIVE INFORMATION SYMBOLS ON (ONLY) FIRST NUMBER OF FREQUENCY RESOURCES

906: DETERMINE 2ND (EXPRESSIBLE AS $2^a \cdot 3^b \cdot 5^c$) AND 3RD (REMAINING) RESOURCES IN 1ST NUMBER OF FREQUENCY RESOURCES 908: RECEIVE INFORMATION SYMBOLS, SIGNAL ELEMENTS, OR BOTH ON 2ND RESOURCES AND 3RD RESOURCES

910: PERFORM RECEPTION SIGNAL PROCESSING ON INFORMATION ELEMENTS

Fig. 9

RESOURCE ELEMENT ALLOCATION IN CELLULAR SYSTEM

RELATED APPLICATION

This application claims priority to PCT Application No. PCT/EP2021/057332, filed on Mar. 23, 2023, which is incorporated herein by reference in its entirety.

FIELD

Various embodiments described herein relate to the field of wireless communications and, particularly, to allocation of a resource elements in a cellular communication system.

BACKGROUND

In conventional cellular communication systems, an access node allocates time-frequency transmission resources to terminal devices. The transmission resources are allocated in units of physical resource blocks (PRB) where a PRB occupies a certain amount of frequency resources and a certain amount of time resources. In modern cellular communication systems based on multi-carrier or virtual multi-carrier technology such as orthogonal frequency division multiplexing (OFDM) or single-carrier frequency division multiple access (SC-FDMA), also known as a discrete Fourier transform spread orthogonal frequency division multiplexing (DFT-S-OFDM), the certain amount of frequency resources of a PRB means a certain number of sub-carriers, e.g. 12 sub-carriers. The certain amount of time resources may mean a certain number of symbols to form a time unit, e.g. a slot or a sub-frame.

Such granularity in the allocation may generate situations where some physical resource blocks become unallocatable.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus comprising means for performing: determining time-frequency resources in a channel configuration, wherein the time-frequency resources is a combination of a first number of frequency resources and a number of time resources, wherein the first number of frequency resources is defined in units of consecutive resource blocks each having a determined number of resource elements; determining whether or not the first number of frequency resources is expressible as $2^a \cdot 3^b \cdot 5^c$ where [a, b, c] are non-negative integers, and in case the first number of frequency resources is not expressible as $2^a \cdot 3^b \cdot 5^c$, determining a second number of frequency resources and a third number of frequency resources in the first number of frequency resources, wherein the second number of frequency resources is expressible as $2^a \cdot 3^b \cdot 5^c$, wherein the third number of frequency resources is not overlapping with the second number of frequency resources; occupying the second number of frequency resources within the number of time resources with information symbols and occupying the third number of frequency resources within the number of time resources for a wireless transmission; and generating and causing the wireless transmission comprising the occupied frequency resources.

In an embodiment, the means are configured to occupy the third number of frequency elements with information symbols, signal elements, or both.

In an embodiment, the means are configured to compute signal elements for shaping a waveform of the wireless transmission and to occupy the third number of frequency resources with the computed signal elements.

In an embodiment, at least some of the third number of frequency resources are used for spectrum extension, and wherein the means are configured to copy information symbols from at least some resource blocks occupying the second number of frequency resources as said signal elements to the third number of frequency resources and to apply a spectrum-shaping filter on the information symbols and the signal elements occupying the second number of frequency resources and the third number of frequency resources.

In an embodiment, at least some of the third number of frequency resources are used for tone reservation, and wherein the means are configured to compute, as the signal elements, a peak correction signal reducing a peak in a time-domain representation of the information symbols occupying the second number of frequency resources.

In an embodiment, the second number of frequency resources equals to the greatest number of frequency resources in the first number of frequency resource that is expressible as $2^a \cdot 3^b \cdot 5^c$ in units of consecutive resource blocks, and wherein third number of frequency resources are comprised in the remaining first number of frequency resources.

In an embodiment, the third number of frequency resources fill at least one resource block completely.

In an embodiment, the second number of frequency resources or the third number of frequency resources fill at least one resource block only partially.

In an embodiment, the second number of frequency resources and the third number of frequency resources are together expressible as $2^a \cdot 3^b \cdot 5^c$ in the units of resource elements, and wherein the means are configured to carry out a discrete Fourier transform over the information symbols occupying the second number of frequency resources and the third number of frequency resources to produce a discrete-Fourier-transform-precoded orthogonal frequency division multiplexing signal.

In an embodiment, the means are configured to receive, from a serving access node, a scheduling message indicating the channel configuration.

In an embodiment, the scheduling message comprises at least one information element indicating at least one location of the third number of frequency resources with respect to the second number of frequency resources.

In an embodiment, the third number of frequency resources are located on both sides of the second number of frequency resources.

In an embodiment, the means are configured to receive from the serving access node a control message disabling the occupation of the third number of frequency resources in connection with another wireless transmission and, in response to the disabling, omit occupation of the third number of frequency resources.

In an embodiment, the means are configured to determine, on the basis of the second number of frequency resources, a transport block size of a physical uplink shared channel and to use the transport block size in the wireless transmission.

In an embodiment, the means comprise at least one processor and at least one memory including computer program code, the at least one memory and computer program code configured to, with the at least one processor, cause the performance of the apparatus.

According to an aspect, there is provided an apparatus comprising means for performing: determining time-frequency resources in a channel configuration of a terminal device, wherein the time-frequency resources is a combination of the first number of frequency resources and the number of time resources, wherein the first number of frequency resources is defined in units of consecutive resource blocks each having a determined number of resource elements; determining whether or not the first number of frequency resources is expressible as $2^a \cdot 3^b \cdot 5^c$ where [a, b, c] are non-negative integers, and in case the first number of frequency resources is not expressible as $2^a \cdot 3^b \cdot 5^c$, determining the second number of frequency resources and the third number of frequency resources in the first number of frequency resources, wherein the second number of frequency resources is expressible as $2^a \cdot 3^b \cdot 5^c$, wherein the third number of frequency resources is not overlapping with the second number of frequency resources; receiving a wireless transmission according to the channel configuration, the wireless transmission comprising the second number of frequency resources occupied with the information symbols and the third number of frequency resources; and performing reception signal processing on the wireless transmission.

In an embodiment, the third number of frequency resources is occupied with information symbols, signal elements, or both.

According to an aspect, there is provided a method comprising: determining, by an apparatus, time-frequency resources in a channel configuration, wherein the time-frequency resources is a combination of a first number of frequency resources and a number of time resources, wherein the first number of frequency resources is defined in units of consecutive resource blocks each having a determined number of resource elements;

determining, by the apparatus, whether or not the first number of frequency resources is expressible as $2^a \cdot 3^b \cdot 5^c$ where [a, b, c] are non-negative integers, and in case the first number of frequency resources is not expressible as $2^a \cdot 3^b \cdot 5^c$, determining a second number of frequency resources and a third number of frequency resources in the first number of frequency resources, wherein the second number of frequency resources is expressible as $2^a \cdot 3^b \cdot 5^c$, wherein the third number of frequency resources is not overlapping with the second number of frequency resources; occupying, by the apparatus, the second number of frequency resources within the number of time resources with information symbols and occupying the third number of frequency resources within the number of time resources for a wireless transmission; and generating and causing, by the apparatus, the wireless transmission comprising the occupied frequency resources.

In an embodiment, the apparatus occupies the third number of frequency elements with information symbols, signal elements, or both.

In an embodiment, the apparatus computes signal elements for shaping a waveform of the wireless transmission and to occupy the third number of frequency resources with the computed signal elements.

In an embodiment, at least some of the third number of frequency resources are used for spectrum extension, and wherein the apparatus copies information symbols from at least some resource blocks occupying the second number of frequency resources as said signal elements to the third number of frequency resources and applies a spectrum-shaping filter on the information symbols and the signal elements occupying the second number of frequency resources and the third number of frequency resources.

In an embodiment, at least some of the third number of frequency resources are used for tone reservation, and wherein the apparatus computes, as the signal elements, a peak correction signal reducing a peak in a time-domain representation of the information symbols occupying the second number of frequency resources.

In an embodiment, the second number of frequency resources equals to the greatest number of frequency resources in the first number of frequency resource that is expressible as $2^a \cdot 3^b \cdot 5^c$ in units of consecutive resource blocks, and wherein third number of frequency resources are comprised in the remaining first number of frequency resources.

In an embodiment, the third number of frequency resources fill at least one resource block completely.

In an embodiment, the second number of frequency resources or the third number of frequency resources fill at least one resource block only partially.

In an embodiment, the second number of frequency resources and the third number of frequency resources are together expressible as $2^a \cdot 3^b \cdot 5^c$ in the units of resource elements, and wherein the apparatus carries out a discrete Fourier transform over the information symbols occupying the second number of frequency resources and the third number of frequency resources to produce a discrete-Fourier-transform-precoded orthogonal frequency division multiplexing signal.

In an embodiment, the apparatus receives, from a serving access node, a scheduling message indicating the channel configuration.

In an embodiment, the scheduling message comprises at least one information element indicating at least one location of the third number of frequency resources with respect to the second number of frequency resources.

In an embodiment, the third number of frequency resources are located on both sides of the second number of frequency resources.

In an embodiment, the apparatus receives from the serving access node a control message disabling the occupation of the third number of frequency resources in connection with another wireless transmission and, in response to the disabling, omits occupation of the third number of frequency resources.

In an embodiment, the apparatus determines, on the basis of the second number of frequency resources, a transport block size of a physical uplink shared channel and to use the transport block size in the wireless transmission.

According to an aspect, there is provided a method comprising: determining, by an apparatus, time-frequency resources in a channel configuration of a terminal device, wherein the time-frequency resources is a combination of the first number of frequency resources and the number of time resources, wherein the first number of frequency resources is defined in units of consecutive resource blocks each having a determined number of resource elements; determining, by the apparatus, whether or not the first number of frequency resources is expressible as $2^a \cdot 3^b \cdot 5^c$ where [a, b, c] are non-negative integers, and in case the first number of frequency resources is not expressible as $2^a \cdot 3^b \cdot 5^c$, determining the second number of frequency resources and the third number of frequency resources in the first number of frequency resources, wherein the second number of frequency resources is expressible as $2^a \cdot 3^b \cdot 5^c$, wherein the third number of frequency resources is not overlapping with the second number of frequency resources; receiving, by the apparatus, a wireless transmission according to the channel configuration, the wireless transmission comprising the second number of frequency resources occupied with the information symbols and the third number of frequency resources; and performing, by the apparatus, reception signal processing on the wireless transmission.

In an embodiment, the third number of frequency resources is occupied with information symbols, signal elements, or both.

According to an aspect, there is provided a computer program product embodied on a computer-readable medium and comprising a computer program code readable by a computer, wherein the computer program code configures the computer to carry out a computer process comprising: determining time-frequency resources in a channel configuration, wherein the time-frequency resources is a combination of a first number of frequency resources and a number of time resources, wherein the first number of frequency resources is defined in units of consecutive resource blocks each having a determined number of resource elements; determining whether or not the first number of frequency resources is expressible as $2^a \cdot 3^b \cdot 5^c$ where [a, b, c] are non-negative integers, and in case the first number of frequency resources is not expressible as $2^a \cdot 3^b \cdot 5^c$, determining a second number of frequency resources and a third number of frequency resources in the first number of frequency resources, wherein the second number of frequency resources is expressible as $2^a \cdot 3^b \cdot 5^c$, wherein the third number of frequency resources is not overlapping with the second number of frequency resources; occupying the second number of frequency resources within the number of time resources with information symbols and occupying the third number of frequency resources within the number of time resources for a wireless transmission; and generating and causing the wireless transmission comprising the occupied frequency resources.

According to an aspect, there is provided a computer program product embodied on a computer-readable medium and comprising a computer program code readable by a computer, wherein the computer program code configures the computer to carry out a computer process comprising: determining time-frequency resources in a channel configuration of a terminal device, wherein the time-frequency resources is a combination of the first number of frequency resources and the number of time resources, wherein the first number of frequency resources is defined in units of consecutive resource blocks each having a determined number of resource elements; determining whether or not the first number of frequency resources is expressible as $2^a \cdot 3^b \cdot 5^c$ where [a, b, c] are non-negative integers, and in case the first number of frequency resources is not expressible as $2^a \cdot 3^b \cdot 5^c$, determining the second number of frequency resources and the third number of frequency resources in the first number of frequency resources, wherein the second number of frequency resources is expressible as $2^a \cdot 3^b \cdot 5^c$, wherein the third number of frequency resources is not overlapping with the second number of frequency resources; receiving a wireless transmission according to the channel configuration, the wireless transmission comprising the second number of frequency resources occupied with the information symbols and the third number of frequency resources; and performing reception signal processing on the wireless transmission.

LIST OF DRAWINGS

Embodiments are described below, by way of example only, with reference to the accompanying drawings, in which FIG. 1 illustrates a wireless communication scenario to which some embodiments of the invention may be applied;

FIG. 7 illustrates an embodiment of combination of embodiments of FIGS. 3 and 6;

FIG. 8 illustrates a signalling diagram of an embodiment for enabling use of the extension frequency resources in a terminal device;

FIG. 9 illustrates a flow diagram of an embodiment for utilizing time-frequency resources in wireless reception.

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figures 1, 2:
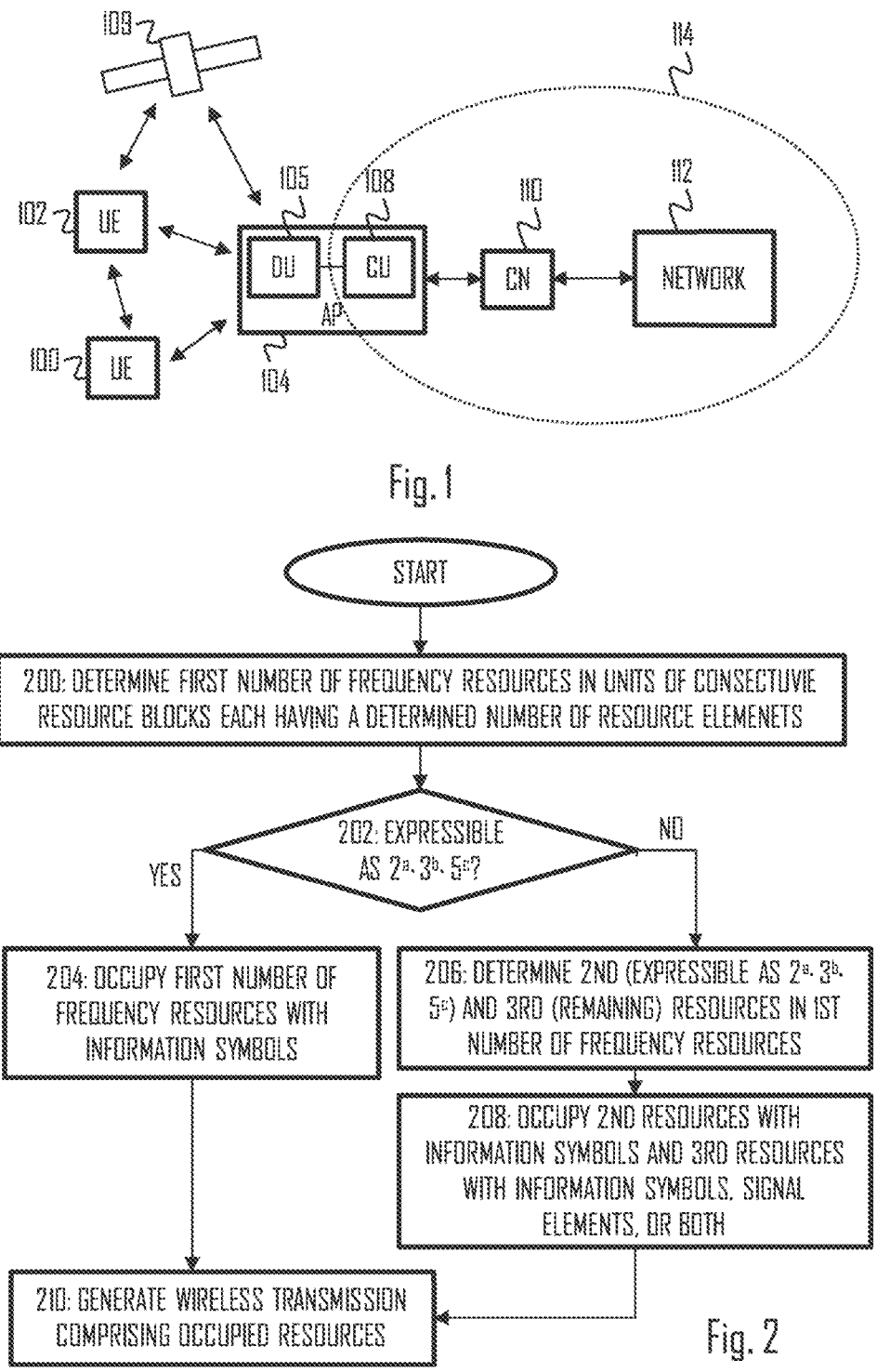
FIG. 2 illustrates a flow diagram of an embodiment for utilizing time-frequency resources in wireless transmission.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used not only for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station. 5G specifications define two relay modes: out-of-band relay where same or different carriers may be defined for an access link and a backhaul link; and in-band-relay where the same carrier frequency or radio resources are used for both access and backhaul links. In-band relay may be seen as a baseline relay scenario. A relay node is called an integrated access and backhaul (IAB) node. It has also inbuilt support for multiple relay hops. IAB operation assumes a so-called split architecture having CU and a number of DUs. An IAB node contains two separate functionalities: DU (Distributed Unit) part of the IAB node facilitates the gNB (access node) functionalities in a relay cell, i.e. it serves as the access link; and a mobile termination (MT) part of the IAB node that facilitates the backhaul connection. A Donor node (DU part) communicates with the MT part of the IAB node, and it has a wired connection to the CU which again has a connection to the core network. In the multihop scenario, MT part (a child IAB node) communicates with a DU part of the parent IAB node.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 105) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 109 in the mega-constellation may cover several satellite-enabled network entities that create on-ground cells. The on-ground cells may be created through an on-ground relay node or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto-or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

Spectrum shaping capability has been developed to the modern cellular communication systems. In a simplified form, the spectrum shaping introduces extension resources for transmission, and these extension resources may be used to modify spectral properties of a signal being transmitted. The spectrum shaping may be used without the extensions resource as well. The purpose of the spectrum shaping may be to shape the spectrum such that the peak-to-average power ratio (PAPR) described in Background and/or maximum power reduction (MPR) can be reduced, thus providing improvements in radio coverage. The MPR relates to limiting a maximum transmission power reduction of a terminal device in an attempt to control radio emissions towards the user. The MPR may be understood as allowed reduction of maximum power level (power backoff) a terminal device can use, for example for a given modulation scheme. The MPR depends on a signal waveform, e.g. an orthogonal frequency division multiplexing (OFDM) waveform has a larger PAPR than a discrete Fourier transform spread orthogonal frequency division multiplexing (DFT-S-OFDM) waveform and, thus, requires a larger MPR value. Spectrum shaping can enable smaller MPR (at least for certain scenarios), resulting in higher effective transmit power and improved coverage. In some systems, the spectrum shaping is applied with or without the extension resource.

As described in Background, an access node 104, 109 schedules time-frequency resources to the terminal devices 100, 102 with a certain granularity, e.g. in units of resource blocks comprising a determined number of resource elements. A resource element may be understood to occupy a certain bandwidth part on a certain frequency band, and a resource block may include multiple resource elements. In the LTE and 5G specifications, a (virtual) sub-carrier is the resource element, and the frequency band occupied by the sub-carrier is determined by the bandwidth of the sub-carrier and a sub-carrier spacing indicating a spacing of the sub-carriers in the resource block. An example of the number of resource elements per resource block is 12 resource elements. In addition to this granularity, there may be other factors that limit the number of actually usable or allocatable resource blocks. An example of such a factor is the DFT size performed at the terminal device. As known in the art, the DFT complexity can be kept reasonable when the number of frequency bins (sub-carriers or above-described resource-elements) can be expressed by a product of powers 2, 3, and 5. Therefore, to enable efficient DFT for the above-described DFT-S-OFDM waveform, for example, the number of scheduled resource blocks for a physical uplink shared channel (PUSCH) should also be expressible by the product of powers 2, 3, and 5, following the notation $$M_{RB}^{PUSCH} = 2^a \cdot 3^b \cdot 5^c$$

where a, b, and c are non-negative integers. At least some of them may be zero in some cases. This condition results in that certain resource block combinations are not allocatable which causes sub-optimal spectral efficiency of the uplink transmissions. For example, in 5G specifications for a 20 MHz channel with 15 kHz sub-carrier spacing on frequency range 1 (below 6 GHz), the number of resource blocks is 106 while the maximum number expressible with the above notation is 100, resulting in six empty resource blocks that cannot be allocated. For a 70 MHz channel with 30 kHz sub-carrier spacing, the number of resource blocks is 189 while the maximum number expressible with the above notation is 180, resulting in nine empty resource blocks that cannot be allocated. This is almost 5% of the number of PRBs and reduces the achievable peak data rate with DFT-S-OFDM accordingly. Several other bandwidths and other sub-carrier spacings at other frequency ranges have the same deficiency.

FIG. 2 illustrates a process for determining transmission resources for an apparatus, e.g. the terminal device 100 or 102. The process comprises determining (block 200) time-frequency resources in a channel configuration, wherein the time-frequency resources is a combination of a first number of frequency resources and a number of time resources, wherein the first number of frequency resources is defined in units of consecutive resource blocks each having a determined number of resource elements; determining (block 202) whether or not the first number of frequency resources is expressible as $2^a \cdot 3^b \cdot 5^c$ where [a, b, c] are non-negative integers. In case the first number of frequency resources is not expressible as $2^a \cdot 3^b \cdot 5^c$ ('no' in block 202), determining (block 206) a second number of frequency resources and a third number of frequency resources in the first number of frequency resources, wherein the second number of frequency resources is expressible as $2^a \cdot 3^b \cdot 5^c$ in the units of consecutive resource elements, wherein the third number of frequency resources is not overlapping with the second number of frequency resources; and occupying (block 208) the second number of frequency resources within the number of time resources with information symbols and occupying the third number of frequency resources within the number of time resources for a wireless transmission; and generating (block 210) and transmitting the wireless transmission comprising the occupied frequency resources.

Figure 3:
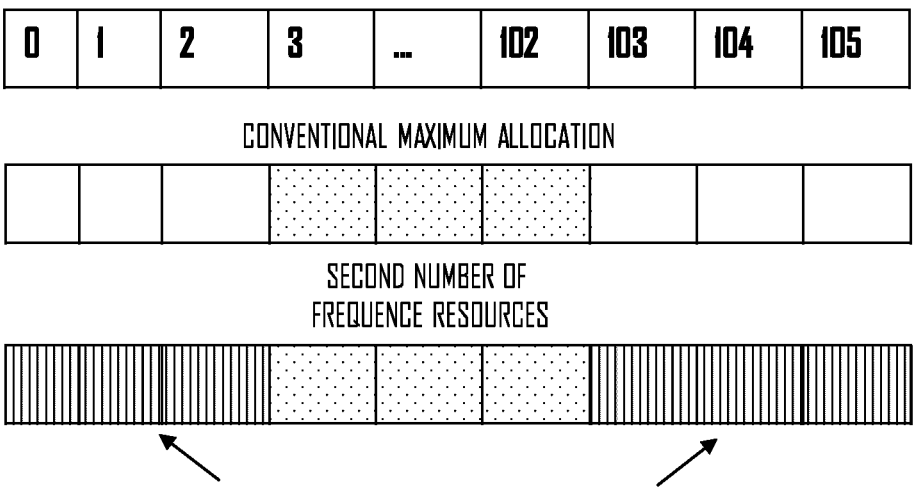
FIG. 3 illustrates an embodiment of using extension frequency resources for signal elements shaping a waveform of a wireless transmission.

With the embodiment of FIG. 3, the third number of frequency resources are available for occupation by the wireless transmission. Accordingly, there third number of frequency resources are not automatically excluded from the wireless transmission, thus providing capability to improve spectral efficiency.

In an embodiment, it is determined in block 202 whether or not the first number of frequency resources is expressible as $2^a \cdot 3^b \cdot 5^c$ in units of consecutive (frequency domain) resource blocks. Similarly, the second number of frequency resources may be determined in the units of consecutive resource blocks. In another embodiment, the frequency resources are determined in blocks 202 and/or 206 in units of consecutive resource elements.

In an embodiment, the third number of frequency resources is occupied with information symbols, signal elements, or both. Then, the procedure distinguishes from the above-described situation in such that not only the resource blocks that can be expressed as $2^a \cdot 3^b \cdot 5^c$ (the second frequency resources) in the units of consecutive resource blocks are utilized but also the resource block(s) represented by the third number of frequency resources. Accordingly, the additional frequency resources are not left blank, thus improving the spectral efficiency.

If the first number of frequency resources is expressible as $2^a \cdot 3^b \cdot 5^c$ in the units of consecutive resource blocks ('yes' in block 202), the process may proceed to block 204 where the first number of frequency resources is populated with the information symbols in a conventional manner. In this situation, there may be no need to perform blocks 206 and 208 to improve the spectral efficiency.

The first number of frequency resources may be understood as time-frequency scheduled by the access node to the terminal device. In case the access node schedules the first number of frequency resources that is expressible as $2^a \cdot 3^b \cdot 5^c$ in the units of consecutive resource blocks, the terminal device may proceed in the conventional manner. However, if the access node schedules the first number of frequency resources that is not expressible as $2^a \cdot 3^b \cdot 5^c$ in the units of consecutive resource blocks, the terminal device may perform blocks 206 and 208 to determine the second and third number of frequency resources and populate them both, with information symbols and, optionally, with other signal elements. In some embodiments, the third number of frequency resources are determined to be left empty (blanked). However, even in that case the third number of frequency resources are available or reserved for the wireless transmission, thus effectively occupying the third number of frequency resources.

For the sake of notation, the meaning of the first number of frequency resources being expressible as $2^a \cdot 3^b \cdot 5^c$ means may be understood such that the first number of frequency resources is a factor of 2, 3, or 5. As an example, let us consider ten resource blocks comprising 120 resource elements, which is expressible as $2^a \cdot 3^b \cdot 5^c$ in the units of resource elements when a=3, b=1, and c=1. It is also expressible as $2^a \cdot 3^b \cdot 5^c$ in the units of resource blocks when a=1, b=0, and c=1. In some cases, the first number of frequency resources may be a factor of 2, 3, and 5 which is a special case. In the description herein, the frequency resources are considered expressible as $2^a \cdot 3^b \cdot 5^c$ in various units such as resource blocks and/or resource elements, depending on the embodiment. For the purpose of the DFT efficiency, the consideration may be made on the level of resource elements. However, scheduling of time-frequency resources (defining the channel configuration) is conventionally made in the units of consecutive resource blocks. When the number of resource elements in a resource block is expressible as $2^a \cdot 3^b \cdot 5^c$, the number of resource blocks expressible as $2^a \cdot 3^b \cdot 5^c$ means that the number of resource elements in the number of resource blocks is also expressible as $2^a \cdot 3^b \cdot 5^c$. However, when the number of resource blocks (e.g. the first number of frequency resources) is not expressible as $2^a \cdot 3^b \cdot 5^c$, a number of resource elements within the first number of resource blocks may still be found that is expressible as $2^a \cdot 3^b \cdot 5^c$, as described below.

In an embodiment, the second number of frequency resources equals to the greatest number of frequency resources in the first number of frequency resource that is expressible as $2^a \cdot 3^b \cdot 5^c$ in the units of resource blocks, and the remaining frequency resources of the first number of frequency resources forms the third number of frequency resources. For example, if the first number of frequency resources is 11 resource blocks (132 resource elements), the second number of frequency resources may be 10 resource blocks that is expressible as $2^a \cdot 3^b \cdot 5^c$ in the units of resource blocks. The remaining resource block then forms the third number of frequency resources. The third number of frequency resources may thus form at least one resource block.

The information symbols may be understood to represent payload data symbols and/or signaling symbols. Embodiments of the signaling symbols include demodulation reference symbols or other reference signal symbols, channel state information symbols, packet acknowledgment symbols, and other symbols used for signaling information between the terminal device and the access node. The payload data represents application data that is transferred between the terminal device and the access node. The signal elements may include signals that are used to shape a signal waveform of the transmission, and several embodiments of the signal elements are described below.

FIG. 3 illustrates an embodiment where the third number of frequency resource that would be left unused in the conventional solutions are occupied with the signal elements for shaping the waveform of the transmission. FIG. 3 illustrates, as an example, a case of a 20-MHz channel configuration with 15 kHz sub-carrier spacing where, in the conventional solution, resource blocks 3 to 102 can be scheduled in compliance with the expression as $2^a \cdot 3^b \cdot 5^c$ in the units of consecutive resource blocks. This is indicated by the dotted resource blocks in FIG. 3. This solution leaves resource blocks 0 to 2 and 103 to 105 blank and unused. In the present embodiment, the scheduled allocation (the first number of frequency resources) may include resource blocks from 0 to 105, including the resource blocks that would be left unallocated in the conventional solution. Now, the first number of frequency resources, e.g. the scheduled frequency resources, comprises the second number of frequency resources that may be occupied with the information symbols, as in the conventional solution. Additionally, the first number of frequency resources comprises the third number of frequency resources (resource blocks 0 to 2 and 103 to 105 with vertical lining in FIG. 3) that is filled with the signal elements for shaping the waveform of the transmission.

Figure 4:
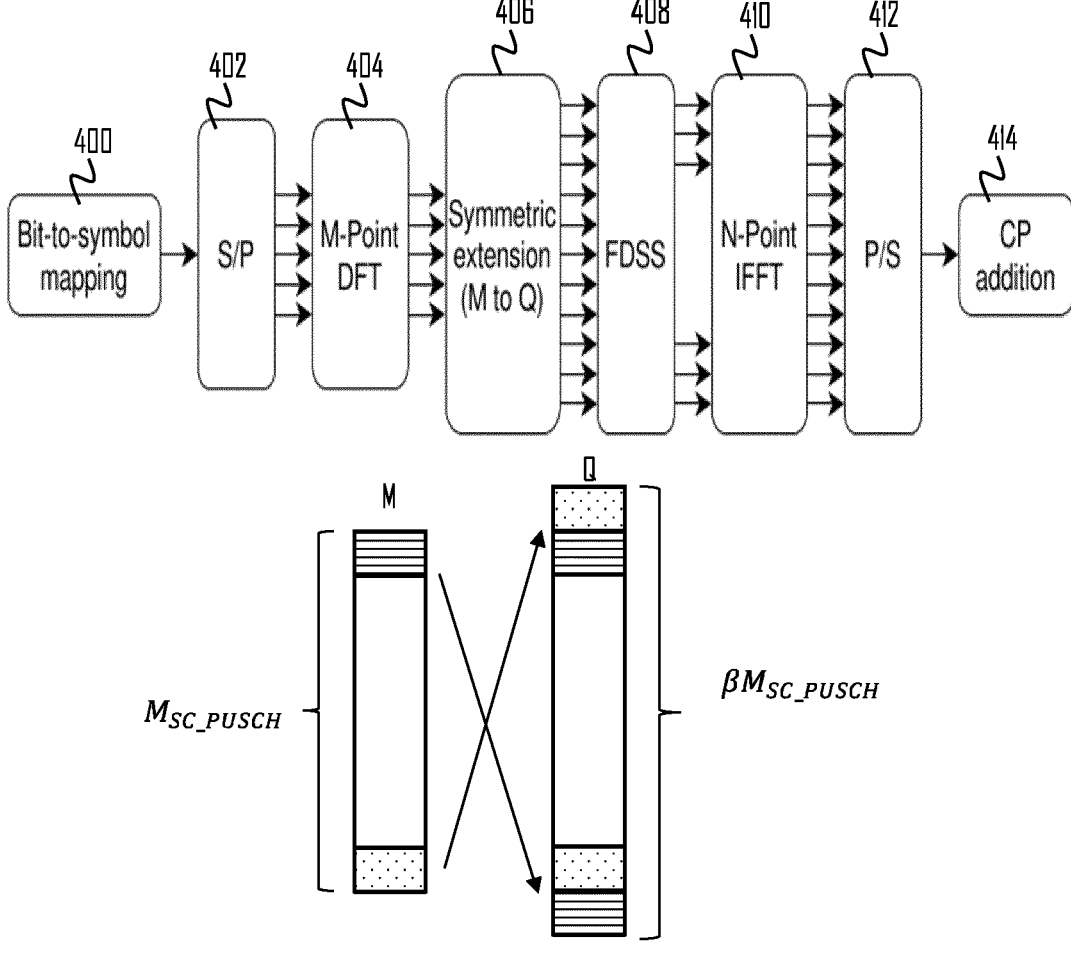
FIG. 4 illustrates an embodiment of frequency-domain spectral shaping principle.

In an embodiment, the signal elements are computed according to a frequency-domain spectrum shaping (FDSS) principle illustrated in FIG. 4. FIG. 4 illustrates a system supporting the spectrum shaping with extension resources (the third number of frequency resources), although a transmitter may decide whether or not to use the extension resources. A criterion for the decision may be properties of scheduled resource allocations, e.g. a combined waveform of the information symbols on the second number of frequency resources. The transmitter of FIG. 4 is a DFT-S-OFDM transmitter that is in the LTE and 5G systems the terminal device. However, the spectral extension may be equally applied to downlink transmissions where the transmitter may be an OFDM transmitter without the DFT-spreading, or the DFT-S-OFDM transmitter.

Referring to FIG. 4, bits to be transmitted are translated in to symbols according to a selected modulation scheme in block 400. Then, the symbols are converted from a serial form to a parallel form (S/P) in block 402 and subjected to an M-point DFT in block 404. These are standard blocks of an LTE or 5G transmitter, so they are not described in greater detail. In the example illustrated in FIG. 4, the extension blocks are then occupied in block 406 with duplicates of information symbols on the second number of frequency resources via symmetric extension where a certain number of frequency bins at one end of the spectrum are copied to the other end of the spectrum to form signal elements on at least a part of the third number of frequency resources. Similarly, a certain number (same or different) of frequency bins at the other end of the spectrum are copied (or mirrored) to the one end of the spectrum, as illustrated in the lower half of FIG. 4, to form signal elements on another part of the third number of frequency resources. In other words, a block of information symbols at a lower end of the second number of frequency resources is copied to the higher end of the second number of frequency resources and vice versa. Accordingly, the length $M_{SC\_PUSCH}$ of the wireless transmission is extended to by a spectral extension factor $\beta$ to $\beta M_{SC\_PUSCH}$, where $M_{SC\_PUSCH}$ denotes the second number of frequency resources in units of resource elements on a physical uplink shared channel (PUSCH). In FIG. 4, Q equals to $\beta M_{SC\_PUSCH}$. In case of a DFT-S-OFDM transmitter, a resource element may be understood as a virtual sub-carrier. A similar arrangement can be defined for downlink. In some examples, filtering is applied in a frequency domain spectrum shaping block 408 to the signals at the extensions to improve the spectrum shaping properties. This may improve a peak-to-average power ratio of the wireless transmission, for example, thus improving power-efficiency of the transmitter. Thereafter, the filtered signal may be inverse-transformed in an inverse DFT (IDFT) block 410, returned to the serial form in block 412, and a cyclic prefix may be added to the resulting signal in block 414.

With respect to the use of the FDSS, there may be some specifications for the waveform shaping. The specifications relate to the use of an error vector magnitude equalizer in the access node 104. The exact FDSS function may not be specified, but the performance requirements may be specified to define the boundary conditions to the implementation of the FDSS. The conditions may define minimum requirements related to spectral flatness of the waveform of the wireless transmission, in-band/out-of-band emissions, and the error vector magnitude. Characteristics of the error vector magnitude (EVM) equalizer may be used for setting the spectral flatness requirements for pi/2-BPSK (binary phase shift keying) modulation with the spectral shaping. Peak-to-peak variation of the EVM equalizer coefficients contained within the frequency range of the uplink allocation (the first number of frequency resources) is not allowed to exceed the limits defined in the specifications. In conventional solutions, the spectral flatness requirement when the spectral shaping is used for pi/2-BPSK (without spectral extension) may be defined for two frequency ranges that divide the first number of frequency resources into two equal-size parts. The limitations may then be defined as a maximum ripple (in dB) per frequency range, as indicated with parameters X1 and X2 for the respective frequency ranges.

Now that the third number of frequency resources are used as additional frequency resources with respect to the conventional second number of frequency resources, a three-part frequency range definition for the EVM equalizer spectral flatness requirement is proposed, which takes also into account a third frequency range that is reserved for the third number of frequency resources. The first and the second range may divide the second number of frequency resources in the same manner as in the conventional solution, and the EVM equalizer spectral flatness requirements there may be similar to that of the conventional solution. The third range may define the EVM equalizer spectral flatness requirements for the excess band (the third number of frequency resources), and the corresponding spectral flatness requirement can be defined by means of parameter X3. The third range may have more relaxed requirements due to the fact that the excess band is not primarily carrying the (non-redundant) information in this embodiment, but rather it's a partial copy of some of the in-band resource elements, which may or may not be used at the receiver signal processing. The maximum ripple allowed in the first, second, and the third frequency ranges may depend e.g. on the modulation and coding scheme and/or resource block allocation.

The 3-range definition may be determined separately for different scenarios, such as different frequency ranges (FR1, FR2), and/or different channel configurations. The parameter value(s) of X3 may depend also on the size of the excess band. As a part of the 3-range definition, it is proposed that the terminal device may be capable of dynamically selecting the spectral flatness requirements according to the actual transmission scenario. The maximum ripple allowed in different transmission scenarios may be implicitly tied to the uplink resource allocation signalling (such as DCI format 00 and/or 0_1). The parameter (or parameter(s)) adjusting the spectral flatness requirement may be for example, a modulation scheme and coding scheme and/or resource block allocation (allocation size and/or location within the channel bandwidth or bandwidth part). The actual relationship between the parameter(s) and the maximum ripple for different frequency ranges may be tabulated in system specifications. Table 2 shows different examples of how the parameter X3 defining the excess band ripple of the EVM equalizer spectral flatness may be selected for the different transmission scenarios.

| Transmission Scenario | Value of X3 |
|---|---|
| Access node using the excess band in reception | $14 \text{ dB} \leq X3 \leq 17 \text{ dB}$ |
| Access node not using the excess band in reception | $17 \text{ dB} \leq X3 \leq 20 \text{ dB}$ |
| No excess band granted to the terminal device | N/A |

Accordingly, at least some of the third number of frequency resources may be used for the spectrum extension, wherein information symbols from at least some resource blocks occupying the second number of frequency resources are copied as said signal elements to the third number of frequency resources. Further, a spectrum-shaping filter may be applied on the signal elements and, optionally, the information symbols to gain the improvement in the waveform characteristics.

In another embodiment, at least some of the third number of frequency resources are used as the signal elements for shaping the waveform according to a tone reservation principle. Accordingly, at least some of the third number of frequency resources may be used for the tone reservation and, as the signal elements, a peak correction signal is computed to reduce a peak in a time-domain representation of the information symbols occupying the second number of frequency resources.

Figures 5, 6:
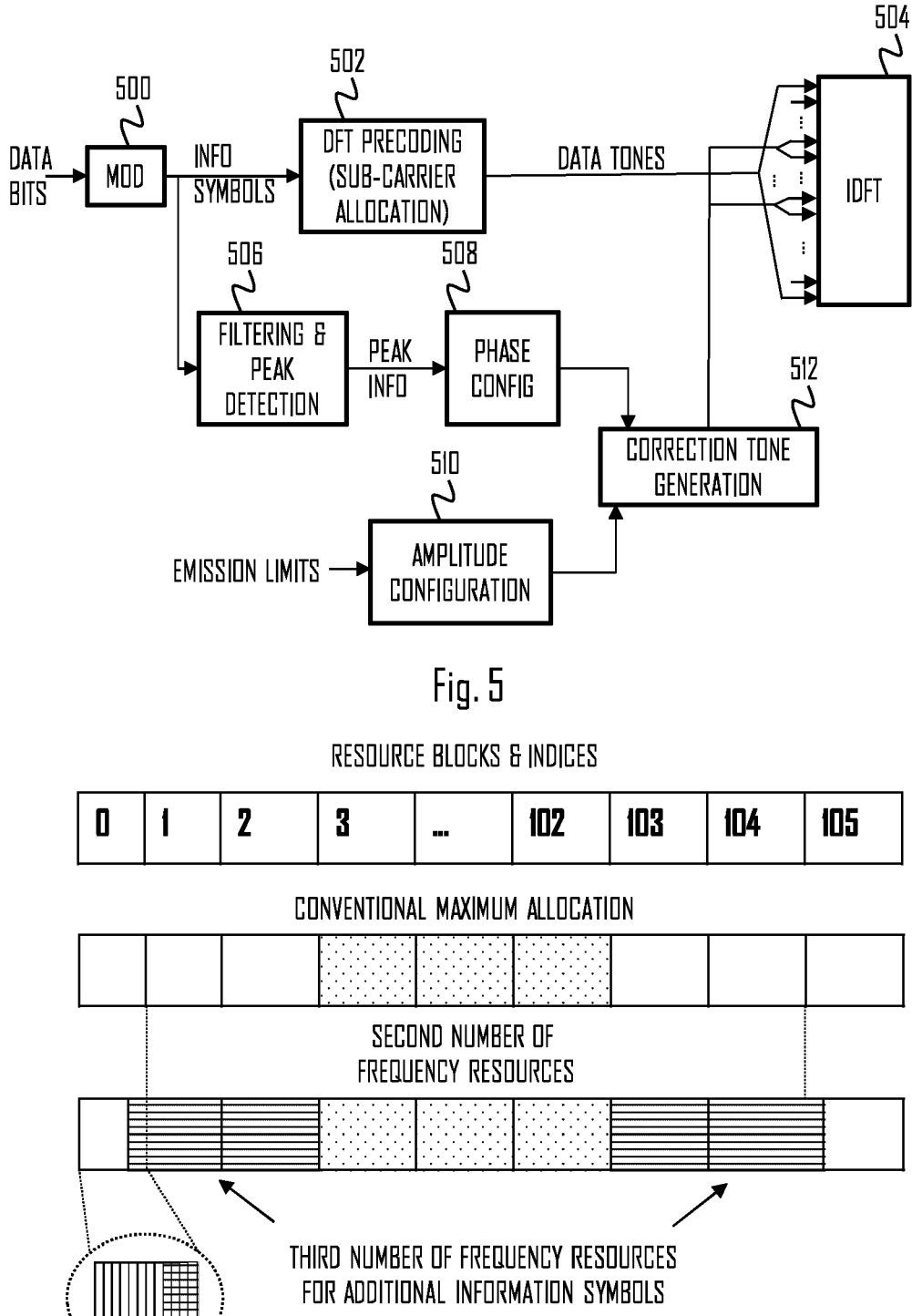
FIG. 5 illustrates an embodiment of tone reservation principle for shaping the waveform of the wireless transmission.
FIG. 6 illustrates an embodiment of using the extension frequency resources for transmission of additional information symbols.

FIG. 5 illustrates an operational block diagram of the procedure for the tone reservation procedure including a peak detection and correction equivalent to peak cancellation. The procedure is described in conjunction with the DFT precoding and inverse DFT (IDFT) for the modulated information symbols. Referring to FIG. 5, the modulated information symbols on the second number of frequency resources are acquired as an output of a modulator 500. The symbols may be input to a DFT block 502 and to a filtering and peak detection block 506. The DFT may include precoding functions where the modulated information symbols are processed according to DFT precoding principles known in the art. Additionally, the precoded information symbols may be allocated to the sub-carriers in block 502, resulting (data) symbol tones on respective sub-carriers as an output. In block 506, a time-domain representation of the information symbols on the second number of frequency resources is subjected to a peak detection procedure. The peak detection may follow a conventional peak detection procedure, e.g. threshold comparison. As an output of block 506, if any peaks are detected in the time-domain representation, information on the peak detection may be output ta phase configuration block 508 configured to compute a peak correction signal that reduces the amplitude of the detected peak(s). The peak correction may include computation of phase values for the peak correction signal to be allocated to the reserved tones on the third number of frequency resources. Then the computed phase values for the peak correction signal are given as an output. The phase values form phases of the peak correction symbols to be allocated to the reserved tones on the third number of frequency resources. As a further input to the phase configuration block, the locations of the reserved tones on the third number of frequency resources may be provided to a correction tone generation block 512.

An amplitude for the peak correction symbols may be computed in an amplitude configuration block 510 receiving, as an input, one or more parameters defining the limitations to the amplitude. Such parameters may include a maximum allowed adjacent channel leakage ratio (ACLR) limit, a maximum permitted emission power limit, etc. Amplitude values of the peak correction symbols are then computed based on the parameter(s). This block needs not to be repeated for all peak correction symbols as the amplitude values are same, if the parameters mentioned above remain the same. Then the computed phase and amplitude values are input to the peak correction tone generation block 512 that generates the peak correction symbols on the respective (virtual) sub-carriers. Thereafter, the information symbol (tones) and the peak correction tones are combined and input to the IDFT block 504 for the IDFT operation. The peak correction symbols may be used to reduce the PAPR at the output of the IDFT, thus improving the efficiency of the following radio frequency operations performed on the signal outputted from the IDFT block 604.

An embodiment uses both FDSS and tone reservation for the waveform shaping. Accordingly, the third number of frequency resources may include a first subset of frequency resources for the signal elements according to the FDSS (duplicates of the information symbols subjected to the frequency-domain filtering) and a second subset of frequency resources for the signal elements of the tone reservation (the peak correction tones).

In both embodiments where the third number of frequency resources is used for the signal elements for shaping the waveform, the apparatus carrying out the embodiment (e.g. the terminal device) may determine to use only some resource elements of the third number of frequency resources and leave the remaining resource elements empty. For example, in the embodiment using the tone reservation only some of the time domain resource elements on the third number of frequency resources need to be used for the peak correction signal. If no peak exceeding the threshold is detected, the peak correction signal needs not to be computed and the third number of frequency resources may even be blanked. In other words, although the third number of frequency resources would be available, the resource elements are chosen not to be used and are left empty. In another embodiment, if the power resources of the apparatus are sufficient, the FDSS or the tone reservation may be disabled temporarily, and the third number of frequency resources may be blanked. There may be other reasons for choosing not to occupy the available third number of frequency resources. In summary, the third number of frequency resources may be occupied with the signal elements in connection with one wireless transmission but be left empty in connection with another wireless transmission, although the third number of frequency resources would have been determined to be available for the occupation. In other embodiments, the occupation of the third number of frequency resources is disabled.

In an embodiment, the second number of frequency resources and the third number of resource blocks are selected such that they are together expressible as $2^a \cdot 3^b \cdot 5^c$ in the units of resource elements, and the third number of frequency resources is occupied with the information symbols. The information symbols may include data symbols and reference signal symbols. The arrangement of the information symbols may follow on the third number of frequency resources the same pattern as on the second number of frequency resources. For example, if the reference symbol(s) is/are provided on both sides of N number of data symbols on the second number of frequency resources, the same patter may be extended to the third number of frequency resources. FIG. 6 illustrates this embodiment.

Referring to FIG. 6, the third number of frequency resources may be used for additional information symbols with the condition that the total number of frequency resource elements on the second and third number of frequency resources is expressible as $2^a \cdot 3^b \cdot 5^c$ in the units of resource elements. Accordingly, the criterion for the efficient DFT implementation is still satisfied by less resource elements are wasted than in the conventional solution. Some resource elements may still be unused, depending on the number of resource elements in the first number of frequency resources, e.g. the scheduled resource blocks.

In other words, upon detecting that the first number of frequency resources is not expressible as $2^a \cdot 3^b \cdot 5^c$ in the units of resource blocks, the investigation is dropped to the units of resource elements and the procedure may continue with finding the highest number of frequency resource elements within the first number of frequency resources that is expressible as $2^a \cdot 3^b \cdot 5^c$ in the units of resource elements. Thereafter, this number of frequency resource elements forms the third number of frequency resources that is occupied with the information symbols. FIG. 6 illustrates that some of the resource blocks that would be left unused in the conventional solution are filled with information symbols completely while some of the resource blocks that would be left unused in the conventional solution are filled with information symbols only partially. The partial filling may result from the condition that the total number of resource elements on the second and third number of frequency resources shall be expressible as $2^a \cdot 3^b \cdot 5^c$ in the units of resource elements. As illustrated in FIG. 6, the partially filled resource blocks may be on both sides of the second number of frequency resources. However, there may be only one partially filled resource block that is on one side of the second number of frequency resources. The information symbols occupying the third number of frequency resources distinguishes from the FDSS in that the information symbols are not duplicates of the information symbols on the second number of frequency resources but can be used for transferring further data and/or other information, e.g. the reference symbols.

In the embodiment of FIG. 6, when the first number of frequency resources is a factor of none of 2, 3, and 5, then K predefined resource elements (e.g. uppermost and/or lowermost with respect to the second number of frequency resources) may be left empty. K may be the smallest integer which fulfills the following equation $$\left(12 \cdot M_{RB}^{PUSCH} - K\right) = 2^{\alpha_2} \cdot 3^{\alpha_3} \cdot 5^{\alpha_5}$$

A demodulation reference symbol (DMRS) sequence may be determined either based on $$\left(12 \cdot M_{RB}^{PUSCH} - K\right)$$

or based on a truncated sequence of length $$\left(12 \cdot M_{RB}^{PUSCH}\right)$$

or truncated sequence of $$\left(12 \cdot N_{RB}^{PUSCH}\right),$$

where $$N_{RB}^{PUSCH}$$

is the smallest integer fulfilling the following criteria $$12 \cdot N_{RB}^{PUSCH} = 2^{\alpha_2} \cdot 3^{\alpha_3} \cdot 5^{\alpha_5}$$

where $$N_{RB}^{PUSCH} \geq M_{RB}^{PUSCH}.$$

The embodiment of FIG. 6 further improves the spectral efficiency by the virtue of a higher number of transferred information symbols. For example, if the frequency channel is a 20 MHz channel with 15 kHz sub-carrier spacing, the number of resource blocks $N_{RB}=106$, but only $$M_{RB}^{PUSCH} =$$

100 resource blocks are allocatable in the conventional solution. Equivalently, the total number of resource elements is $N_{RE}=1272$ and the allocatable resource elements in the conventional solution is $$M_{RE}^{PUSCH} = 1200.$$

In the embodiment of FIG. 6 using the granularity of resource elements instead of the granularity of the resource blocks, the maximum allocation size could be 1250 resource elements, for example, which would mean that 104 resource blocks are used completely while only some resource elements of a single resource block become unused, if used optimally. Even these resource elements may be filled by the signal elements for shaping the waveform.

In case the third number of frequency resources is occupied with the information symbols, the information symbols may be subjected to both DFT and inverse DFT before the wireless transmission. In case the third number of frequency resources is occupied with the signal elements for shaping the waveform, the signal elements may be subjected only to the inverse DFT that is performed between the occupying and the wireless transmission.

As illustrated in FIGS. 3 and 6, at least one resource block of the third number of frequency resources may be filled completely with the information symbols, signal elements, or both. In some embodiments, at least one resource block of the third number of frequency resources is filled only partially (see FIG. 6). There may even be scenarios where at least one resource block of the second number of frequency resources is filled only partially.

FIG. 7 illustrates an embodiment combining the embodiments of FIGS. 3 and 6. Accordingly, the third number of frequency resources may include a first subset of frequency resources occupied with the signal elements according to the embodiment of FIG. 3 (using the FDSS and/or tone reservation) and a second subset of frequency resources occupied with the information symbols according to the embodiment of FIG. 6. The arrangement of the first and second subset of frequency resources with respect to the second number of frequency resources may vary according to the implementation. For example, both subsets may be arranged on both sides of the second number of frequency resources, or the first subset may be on one side while the second subset is on the other side of the second number of frequency resources.

As described above, the apparatus performing the process of FIG. 2 or any one of the embodiments of FIGS. 3 to 6 may be configured to carry out a DFT over the information symbols occupying the second number of frequency resources (and the third number of frequency resources in some embodiments) to produce a discrete-Fourier-transform-precoded orthogonal frequency division multiplexing (DFT-S-OFDM) signal.

As the second number of frequency resources is occupied with the information symbols, it may be determined, on the basis of the second number of frequency resources, a transport block size of a physical uplink shared channel (PUSCH) and the transport block size may be used in the wireless transmission. As known in the art, the transport block is (only) a payload delivered between a medium access control (MAC) and a physical (Phy) layers. A transport block is subjected to signal processing in a transmitter (terminal device) and a receiver (access node). A transport block typically comprises a cyclic redundancy check (CRC) sequence, and it is segmented into code blocks. The receiver typically determines the transport block size before decoding the payload (data). The transport block size is dependent on the number of resource elements available for the payload data and, accordingly, it is dependent on the second number of frequency resources.

In some embodiments where the apparatus carrying out the process of FIG. 2 or any one of the embodiments described above is the terminal device, the terminal device may occupy the third number of frequency resources without explicit signaling with the serving access node. For example, the terminal device may determine on its own volition whether to employ the tone reservation or the FDSS or even to blank the third number of frequency resources. However, benefits may be acquired when the access node is also aware of the occupation of the third number of frequency resources. FIG. 8 illustrates a procedure for such an embodiment.

Referring to FIG. 8, the terminal device 100 may indicate the capability for using the additional frequency resources when transmitting an uplink signal in step 800. The terminal device may also indicate the purpose of using the additional frequency resources, e.g. the tone reservation, FDSS, and/or as additional resources for the information symbols. A condition may be that the access node 104 enables the use of the additional resources, and the enablement may be indicated by the access node in broadcasted system information, for example. The capability of the terminal device may be indicated in a radio resource control (RRC) layer message transmitted by the terminal device, for example in a RRC connection setup request or a RRC reconfiguration message or a RRC signaling message defined for capability indication.

In block 802, the access node may determine whether or not to enable the use of the additional frequency resources for the terminal device 100. The access node may specify a specific operational mode where the use of the additional resources is enabled and how the additional resources shall be used. Accordingly, the configuration may be a semi-static feature that is reconfigured via higher layer signaling, e.g. on the RRC layer. The decision on whether or not to enable the use of the additional frequency resources may depend on various factors, e.g. traffic load at the access node 104. Upon determining to configure the use of the additional frequency resources, the access node may determine corresponding parameters for the configuration of the use of the additional frequency resources. The parameters may include the operational mode, e.g. the tone reservation, FDSS, or use of the resources for additional information symbols, or a combination of these. The parameters may include a location of locations of the third number of frequency resources (the additional frequency resources) with respect to the second number of frequency resources, e.g. on one side or both sides. The location of the third number of frequency resources may be substantially static, e.g. at an either edge or both edges of the second number of frequency resources. The condition may be specified such that the use of the additional frequency resources is enabled for certain transmission formats specified in downlink control information (DCI) or for specific uplink channels. For example, the third number of frequency resources may be enabled for one DCI format and disabled for another DCI format. The third number of frequency resources may be enabled for certain uplink channels (e.g. the PUSCH, physical uplink control channel, PUCCH, or some formats of the PUCCH) and disabled for other uplink channels (e.g. the PUCCH or some formats of the PUCCH, or random access channel, RACH, or a random access message 3 transmitted on the PUSCH). The condition may be specified such that the use of the additional frequency resources is enabled for certain signal waveforms, e.g. the DFT-S-OFDM waveform while disabled for other waveforms, e.g. an OFDM waveform not using the DFT precoding.

Upon determining the parameters, the access node may transmit a downlink message to the terminal device in step 804, indicating that the additional frequency resources have been enabled and, further, the above-described parameter(s). Upon receiving the message in step 804, the terminal device may configure the feature in block 806 and enable the procedure of FIG. 2 of any one of its embodiments. Then, upon receiving an uplink scheduling grant in step 808 from the access node, the terminal device may carry out the process of FIG. 2 (block 810) or an embodiment thereof. Either the downlink message delivered in step 804 (an RRC control message), the scheduling grant delivered in step 808, or another downlink control message may indicate how to utilize the third number of frequency resources and/or enablement of the utilization of the third number of frequency resources. For example, the downlink message may indicate whether to utilize the third number of frequency resources for the transmission of the information symbols and/or signal elements. The downlink message may indicate the signal elements, e.g. for the FDSS or for the tone reservation, or both.

The scheduling grant may indicate the first number of frequency resources by indicating in the scheduling grant a starting resource block index and an ending resource block index of the first number of frequency resources. The access node may schedule only full resource blocks and not those that are partially filled (in the embodiment of FIG. 6), or it may schedule all resource blocks that include signal elements and/or information symbols from the terminal device. The difference to the conventional solution is that the indicated first number of frequency resources is now not (always) expressible as $2^a \cdot 3^b \cdot 5^c$ in the units of resource blocks. Another embodiment may employ conventional scheduling where the access node indicates in the scheduling grant a starting resource block index and an ending resource block index of the first number of frequency resources and the indicated first number of frequency resources is expressible as $2^a \cdot 3^b \cdot 5^c$ in the units of resource blocks. However, because of the enablement and configuration of the use of additional frequency resources, the terminal device may detect the available frequency resources outside the scheduled frequency resources, according to the configuration performed in blocks 802 to 806. In other words, the terminal device interprets the scheduling grant in a different manner when the use of the additional frequency resources is enabled and when the use of the additional frequency resources is disabled.

Then, the terminal device may determine the second and third number frequency resources within the first number of frequency resources and occupy the third number of frequency resources according to the configuration made in block 806 and transmit an uplink signal as the wireless transmission in step 812. With the knowledge that the terminal device is using the additional frequency resources, the access node may process the information symbols on the second number of frequency resources and, additionally, the signal elements and/or information symbols on the third number of frequency resources in block 814. In all embodiments, link gain may be acquired when the access node also processes the signal elements and/or information symbols on the third number of frequency resources.

From the perspective of the access node, let us then describe with reference to FIG. 9 an embodiment of configuring the use of the additional frequency resources in uplink transmissions. The process performed by the access node may comprise: determining (block 900) time-frequency resources in a channel configuration of a terminal device, wherein the time-frequency resources is a combination of the first number of frequency resources and the number of time resources, wherein the first number of frequency resources is defined in units of consecutive resource blocks each having a determined number of resource elements; determining (block 902) whether or not the first number of frequency resources is expressible as $2^a \cdot 3^b \cdot 5^c$ in the units consecutive resource blocks where [a, b, c] are non-negative integers, and in case the first number of frequency resources is not expressible as $2^a \cdot 3^b \cdot 5^c$ in the units of consecutive resource blocks, determining (block 906) the second number of frequency resources and the third number of frequency resources in the first number of frequency resources, wherein the second number of frequency resources is expressible as $2^a \cdot 3^b \cdot 5^c$ in the units of consecutive resource blocks, wherein the third number of frequency resources is not overlapping with the second number of frequency resources; receiving (block 908) a wireless transmission according to the channel configuration, the wireless transmission comprising the second number of frequency resources occupied with the information symbols and the third number of frequency resources occupied with information symbols, signal elements, or both; and performing reception signal processing (block 910) on the wireless transmission.

If it is determined in block 902 that the first number of frequency resources is expressible as $2^a \cdot 3^b \cdot 5^c$ in the units consecutive resource blocks, the process may proceed to block 904 where information symbols are received on the first number of frequency resources without the need to divide the first number of frequency resources, similar to the process of FIG. 2.

In an embodiment, the reception signal processing comprises decoding at least some of the information on the second number of frequency resources and, optionally on the third number of frequency resources.

In an embodiment, the reception signal processing comprises extracting reference symbols comprised as the information symbols on some of the resource elements of the second number of frequency resources and, optionally, the third number of frequency resources, and equalizing, demodulating and/or decoding data symbols on the resource elements of the second number of frequency resources and, optionally, the third number of frequency resources on the basis of the reference symbols. By taking the signal elements on the third number of frequency resources into account, the performance of the equalization and other reception signal processing tasks may be improved.

As described above, the enablement and configuration of the use of the third number of frequency resources may be signaled explicitly to the terminal device. In other embodiments, the enablement is implicit and dependent on certain conditions specified in the uplink scheduling grant, e.g. the size of the uplink resource allocation. When the terminal device detects that the resource allocation is such that the allocated number of resource blocks is not expressible as $2^a \cdot 3^b \cdot 5^c$ in the units of consecutive resource blocks, the terminal device may automatically enable the process of FIG. 2. When the terminal device detects that the resource allocation is such that the allocated number of resource blocks is expressible as $2^a \cdot 3^b \cdot 5^c$ in the units of consecutive resource blocks, the terminal device may automatically disable the process of FIG. 2 and use the conventional solution.

As described above, the terminal device may receive, from the serving access node, the scheduling message indicating the channel configuration and the first number of frequency resources. The scheduling message may comprise at least one information element indicating the location of the third number of frequency resources with respect to the second number of frequency resources. Another option is that the location of the third number of frequency resources is given by the specification.

While the use of the additional frequency resources has been configured according to the embodiment of FIG. 8, for example, the access node may temporarily disable the feature and transmit a control message disabling the occupation of the third number of frequency resources to the terminal device. Upon receiving the control message, the terminal device may reduce the occupied bandwidth accordingly, limit to the second number of frequency resources that leaves some resource blocks (the third number of frequency resources) unoccupied.

System specifications such as the 5G specifications may set limitations to in-band emissions. The in-band emissions may be computed as a ratio between an output power of the terminal device in non-allocated resource blocks with respect to the output power in the allocated resource blocks. Now, since the occupied frequency resources are greater than in the conventional solution and including the third number of frequency resources, the third number of frequency resources may be taken into the allocated resource blocks. Accordingly, the computation of the in-band emissions differs from the conventional solution that does not utilize the third number of frequency resources. If the third number of frequency resources is used for the FDSS, the ratio to compute the in-band emissions may be the power in one non-allocated resource block with respect to the resource block with the highest power spectral density (PSD) as defined for Ti/2-BPSK (binary phase shift keying) modulation in the system specifications for the 5G.

Figure 10:
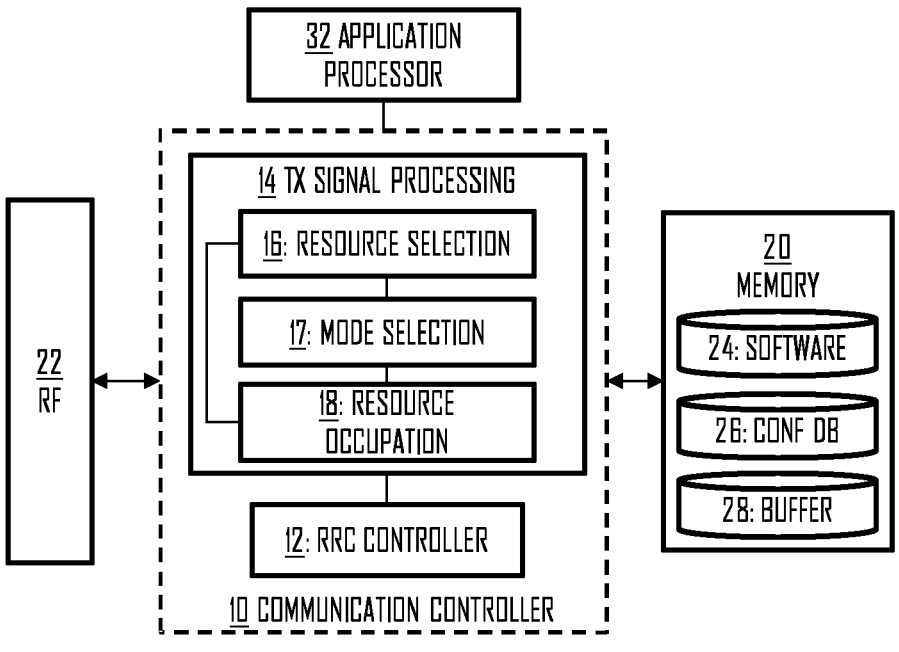
FIGS. 10 and 11 illustrate block diagrams of structures of apparatuses according to some embodiments.

FIG. 10 illustrates an apparatus comprising means for carrying out the process of FIG. 2 or any one of the embodiments described above. The apparatus may comprise a processing circuitry, such as at least one processor, and at least one memory 20 including a computer program code (software) 24, wherein the at least one memory and the computer program code (software) are configured, with the at least one processor, to cause the apparatus to carry out the process of FIG. 2 or any one of its embodiments described above. The apparatus may be for the terminal device 110.

The apparatus may be a circuitry or an electronic device realizing some embodiments of the invention in the terminal device. The apparatus carrying out the above-described functionalities may thus be comprised in such a device, e.g. the apparatus may comprise a circuitry such as a chip, a chipset, a processor, a micro controller, or a combination of such circuitries for the terminal device. The at least one processor or a processing circuitry may realize a communication controller 10 controlling communications in a radio interface of the cellular communication system in the above-described manner. The communication controller may be configured to establish and manage radio connections, transfer of data over the radio connections and utilize time-frequency resources in the wireless transmission of information symbols and signal elements according to any one of the above-described embodiments.

The communication controller 10 may comprise a radio resource control (RRC) controller 12 configured to establish, manage, and terminate radio connections between the access node(s) of the cellular communication system and the terminal device. The RRC controller 12 may be configured, for example, to establish and reconfigure the RRC connections in the terminal device. The RRC controller may carry out steps 800, 804, and 806 of FIG. 8 performed in the terminal device, for example, to enable the use of the additional frequency resources in the terminal device.

The communication controller 10 may further comprise a transmission signal processing circuitry 14 configured to carry out the transmission signal processing functions described in any one of the embodiments above. For example, the circuitry 14 may include the modulation of information symbols, occupation of the time-frequency resources of a channel configuration, performing DFT and IDFT on the information symbols, etc. With respect to the embodiment of FIG. 2, the circuitry 14 may include the hardware and software for realizing blocks 200 to 210.

The transmission signal processing circuitry may comprise a mode selection circuitry 17 configured to enable and disable the process of FIG. 2, i.e. the utilization of the additional frequency resources. The disablement may mean that the terminal device will not be scheduled with first number of frequency resources that is not expressible as $2^a \cdot 3^b \cdot 5^c$ in the units of consecutive resource blocks. However, when the process of FIG. 2 is enabled by the mode selection circuitry 17, the terminal device monitors the availability of the third number of frequency resources and is capable of utilizing them to improve the spectral efficiency.

Upon enabling the process of FIG. 2, the mode selection circuitry may configure a resource selection circuitry 16 to carry out blocks 200 to 208 of FIG. 2. In other words, upon detecting that the channel configuration defines the first number of frequency resources expressible as $2^a \cdot 3^b \cdot 5^c$ in the units of consecutive resource blocks, block 204 may be carried out. Otherwise, the channel configuration may be determined to comprise the third number of frequency resources that are selected by the resource selection circuitry. As described above, even in that case the resource selection circuitry may occasionally determine to blank the third number of frequency resources. The resource selection circuitry may indicate the selected frequency resources to a resource occupation circuitry 18 configured to occupy the selected resources with information symbols and, depending on the operational mode, signal elements for shaping the waveform of a radio signal to be transmitted. Thereafter, the transmission signal processing circuitry may perform other signal processing tasks before transmitting the signal.

The memory 20 may be implemented using any suitable data storage technology, such as semiconductor-based memory devices, flash memory, magnetic memory devices and systems, optical memory devices and systems, fixed memory and removable memory. The memory 20 may comprise a configuration database 26 for storing configuration parameters, e.g. the channel configurations, parameters for the operational mode(s) employing the third number of frequency resources according to any one of the above-described embodiments, and other parameters. The memory 20 may further store a data buffer 28 for uplink data to be transmitted from the apparatus.

The apparatus may further comprise a communication interface 22 comprising hardware and/or software for providing the apparatus with radio communication capability, as described above. The communication interface 22 may include, for example, an antenna, one or more radio frequency filters, a power amplifier, and one or more frequency converters. The communication interface 22 may comprise hardware and software needed for realizing the radio communications over the radio interface, e.g. according to specifications of an LTE or 5G radio interface. The wireless transmissions may be carried out via the communication interface, and the apparatus may receive signalling information from the access node(s) via the communication interface, e.g. in the process of FIG. 8.

Figure 11:
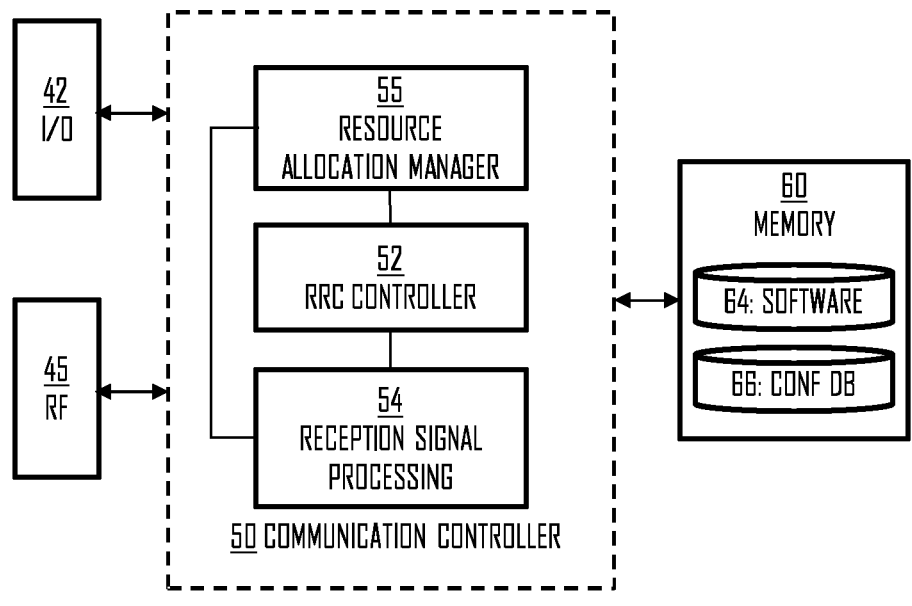

FIG. 11 illustrates an apparatus comprising a processing circuitry, such as at least one processor, and at least one memory 60 including a computer program code (software) 64, wherein the at least one memory and the computer program code (software) are configured, with the at least one processor, to cause the apparatus to carry out functions of the access node 104 in the process of FIG. 9 or any one of its embodiments described above. The apparatus may be for the access node. The apparatus may be a circuitry or an electronic device realizing some of the above-described embodiments in the access node. The apparatus carrying out the above-described functionalities may thus be comprised in such a device, e.g. the apparatus may comprise a circuitry such as a chip, a chipset, a processor, a micro controller, or a combination of such circuitries for the access node. In other embodiments, the apparatus is the access node. The at least one processor or a processing circuitry may realize a communication controller 50 controlling communications in the above-described manner. The communication controller may be configured to establish and manage radio connections and transfer of data over the radio connections.

The communication controller 50 may comprise an RRC controller 52 configured to establish, manage, and terminate radio connections with terminal devices served by the access node. The RRC controller 52 may be configured, for example, to establish and reconfigure the RRC connections with the terminal devices. The RRC controller may carry out steps 800 to 804 of FIG. 8, for example, to enable and configure the use of the additional frequency resources in the terminal device. The communication controller may further comprise a scheduler (not shown) configured to schedule uplink transmission resources to the terminal devices. When the use of the additional resources is configured for the terminal device, the scheduling may differ such that the additional frequency resources left unused otherwise are indicated in the scheduling message(s) indicating the channel configuration and the first number of frequency resources. In some embodiments, the scheduler may indicate in scheduling grants whether or not the tone reservation is configured for a particular terminal device, as described above.

The communication controller 10 may further comprise a resource allocation manager 55 configured to determine the resources to which the reception signal processing in block 910 is subjected. In other words, the resource allocation manager may perform blocks 900, 902, and 906 of FIG. 9 and configure a reception signal processing circuitry 54 to process signals (information symbols and optionally signal elements) on the determined frequency resources, as described above. The reception signal processing circuitry may be configured to carry out one or more of the following signal processing operations on the signals received in the frequency resources indicated by the resource allocation manager 55: (EVM) equalization, demodulation, and decoding.

The memory 60 may be implemented using any suitable data storage technology, such as semiconductor-based memory devices, flash memory, magnetic memory devices and systems, optical memory devices and systems, fixed memory and removable memory. The memory 60 may comprise a configuration database 66 for storing configuration parameters, e.g. the configurations for enabling and disabling the use of the additional frequency resources for the terminal devices. The configuration database may further store information on the terminal devices for which the use of the additional frequency resources has been configured, parameters of the respective configurations, etc.

The apparatus may further comprise a radio frequency communication interface 45 comprising hardware and/or software for providing the apparatus with radio communication capability with the terminal devices, as described above. The communication interface 45 may include, for example, an antenna array, one or more radio frequency filters, a power amplifier, and one or more frequency converters. The communication interface 42 may comprise hardware and software needed for realizing the radio communications over the radio interface, e.g. according to specifications of an LTE or 5G radio interface.

The apparatus may further comprise another communication interface 42 for communicating towards the core network. The communication interface may support respective communication protocols of the cellular communication system to enable communication with other access nodes, with other nodes of the radio access network, and with nodes in the core network and even beyond the core network. The communication interface 42 may comprise necessary hardware and software for such communications.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIG. 2, 9, or any of the embodiments thereof may also be carried out in the form of one or more computer processes defined by one or more computer programs. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus comprising:
at least one processor, and
at least one memory storing instructions that, when executed by the at least one processor, cause the apparatus to:
determine time-frequency resources in a channel configuration, wherein the time-frequency resources are a combination of a first number of frequency resources and a number of time resources, wherein the first number of frequency resources are defined in units of consecutive resource blocks each having a determined number of resource elements;
determine whether or not the first number of frequency resources are expressible as $2^a \cdot 3^b \cdot 5^c$ where [a, b, c] are non-negative integers, and in case the first number of frequency resources are not expressible as $2^a \cdot 3^b \cdot 5^c$, determine a second number of frequency resources and a third number of frequency resources in the first number of frequency resources, wherein the second number of frequency resources are expressible as $2^a \cdot 3^b \cdot 5^c$, wherein the third number of frequency resources are not overlapping with the second number of frequency resources, wherein the second number of frequency resources or the third number of frequency resources fill at least one resource block only partially, and wherein the second number of frequency resources and the third number of frequency resources are together expressible as $2^a \cdot 3^b \cdot 5^c$ in the units of resource elements;
occupy the second number of frequency resources and the third number of frequency resources within the number of time resources with information symbols;
carry out a discrete Fourier transform over the information symbols occupying the second number of frequency resources and the third number of frequency resources to produce a discrete-Fourier-transform-precoded orthogonal frequency division multiplexing signal; and
generate and cause the wireless transmission comprising the occupied frequency resources.

2. The apparatus of claim 1, wherein the instructions, when executed by the at least one processor, cause the apparatus at least to receive, from a serving access node, a scheduling message indicating the channel configuration.

3. The apparatus of claim 2, wherein the scheduling message comprises at least one information element indicating at least one location of the third number of frequency resources with respect to the second number of frequency resources.

4. The apparatus of claim 1, wherein the third number of frequency resources are located on both sides of the second number of frequency resources.

5. The apparatus of claim 1, wherein the instructions, when executed by the at least one processor, cause the apparatus at least to receive from the serving access node a control message disabling the occupation of the third number of frequency resources in connection with another wireless transmission and, in response to the disabling, omit occupation of the third number of frequency resources.

6. The apparatus of claim 1, wherein the instructions, when executed by the at least one processor, cause the apparatus at least to determine, on the basis of the second number of frequency resources, a transport block size of a physical uplink shared channel and to use the transport block size in the wireless transmission.

7. An apparatus comprising:
at least one processor, and
at least one memory storing instructions that, when executed by the at least one processor, cause the apparatus to:
determine time-frequency resources in a channel configuration of a terminal device,
wherein the time-frequency resources are a combination of a first number of frequency resources and a number of time resources, wherein the first number of frequency resources are defined in units of consecutive resource blocks each having a determined number of resource elements;
determine whether or not the first number of frequency resources are expressible as $2^a \cdot 3^b \cdot 5^c$ where [a, b, c] are non-negative integers, and in case the first number of frequency resources are not expressible as $2^a \cdot 3^b \cdot 5^c$, determine a second number of frequency resources and a third number of frequency resources in the first number of frequency resources, wherein the second number of frequency resources are expressible as $2^a \cdot 3^b \cdot 5^c$, wherein the third number of frequency resources are not overlapping with the second number of frequency resources, wherein the second number of frequency resources or the third number of frequency resources fill at least one resource block only partially, and wherein the second number of frequency resources and the third number of frequency resources are together expressible as $2^a \cdot 3^b \cdot 5^c$ in the units of resource elements;
receive a wireless transmission according to the channel configuration, the wireless transmission comprising a discrete-Fourier-transform-precoded orthogonal frequency division multiplexing signal produced based on information symbols occupying the second number of frequency resources and the third number of frequency resources; and
process the wireless transmission.

8. A method comprising:

determining, by an apparatus, time-frequency resources in a channel configuration, wherein the time-frequency resources are a combination of a first number of frequency resources and a number of time resources, wherein the first number of frequency resources are defined in units of consecutive resource blocks each having a determined number of resource elements;

determining, by the apparatus, whether or not the first number of frequency resources are expressible as $2^a \cdot 3^b \cdot 5^c$ where [a, b, c] are non-negative integers, and in case the first number of frequency resources are not expressible as $2^a \cdot 3^b \cdot 5^c$, determining a second number of frequency resources and a third number of frequency resources in the first number of frequency resources, wherein the second number of frequency resources are expressible as $2^a \cdot 3^b \cdot 5^c$, wherein the third number of frequency resources are not overlapping with the second number of frequency resources, wherein the second number of frequency resources or the third number of frequency resources fill at least one resource block only partially, and wherein the second number of frequency resources and the third number of frequency resources are together expressible as $2^a \cdot 3^b \cdot 5^c$ in the units of resource elements;

occupying, by the apparatus, the second number of frequency resources and the third number of frequency resources within the number of time resources with information symbols for a wireless transmission;

carrying out a discrete Fourier transform over the information symbols occupying the second number of frequency resources and the third number of frequency resources to produce a discrete-Fourier-transform-precoded orthogonal frequency division multiplexing signal; and generating and causing, by the apparatus, the wireless transmission comprising the occupied frequency resources.

* * * * *